(12) United States Patent
Condorelli et al.

(10) Patent No.: US 9,069,966 B2
(45) Date of Patent: Jun. 30, 2015

(54) CODE UPDATES IN PROCESSING SYSTEMS

(75) Inventors: Vincenzo Condorelli, Poughkeepsie, NY (US); Silvio Dragone, Winterthur (CH); William S. Fernandez, Poughkeepsie, NY (US); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 653 days.

(21) Appl. No.: 13/270,593

(22) Filed: Oct. 11, 2011

(65) Prior Publication Data

US 2013/0091346 A1    Apr. 11, 2013

(51) Int. Cl.
| | |
|---|---|
| G06F 9/00 | (2006.01) |
| G06F 15/177 | (2006.01) |
| G06F 21/57 | (2013.01) |
| G06F 12/02 | (2006.01) |
| G06F 9/445 | (2006.01) |
| G06F 9/44 | (2006.01) |

(52) U.S. Cl.
CPC .......... G06F 21/575 (2013.01); *G06F 12/0246* (2013.01); *G06F 8/63* (2013.01); G06F 8/665 (2013.01); *G06F 9/4401* (2013.01)

(58) Field of Classification Search
CPC ........................... G06F 12/0246; G06F 9/4401
USPC ............................................................ 713/2
See application file for complete search history.

(56) References Cited

U.S. PATENT DOCUMENTS

| | | | |
|---|---|---|---|
| 6,341,373 B1 * | 1/2002 | Shaw ................................. | 713/2 |
| 6,598,157 B1 * | 7/2003 | McKee ............................. | 713/1 |
| 6,892,297 B1 | 5/2005 | Aguilar et al. | |
| 7,017,038 B1 * | 3/2006 | LaChance et al. ................ | 713/2 |
| 7,305,668 B2 | 12/2007 | Kennedy et al. | |
| 7,398,381 B2 | 7/2008 | Rudelic | |
| 7,487,343 B1 | 2/2009 | Insley et al. | |
| 7,644,406 B2 | 1/2010 | Gustafson et al. | |

(Continued)

FOREIGN PATENT DOCUMENTS

| | | |
|---|---|---|
| EP | 1569102 A1 | 8/2005 |
| EP | 1686477 A1 | 8/2006 |

(Continued)

OTHER PUBLICATIONS

Intellectual Property Office Search Report, Application No. GB1216404.2, Mailed: Oct. 30, 2013, 3 Pages.

J. Iqbal et al., "Real Time Hardware Crypto Cards Based on DSP," 2009 IEEE, Nov. 21-22, 2009 Third International Symposium on Intelligent Information Technology Application, pp. 395-398.

(Continued)

*Primary Examiner* — Jaweed A Abbaszadeh
*Assistant Examiner* — Xuxing Chen
(74) *Attorney, Agent, or Firm* — Cantor Colburn LLP; Margaret McNamara (57) ABSTRACT

A method for updating code images in a system includes booting a first image of a code with a sub-system processor, receiving a second image of the code, performing a security and reliability check of the second image of the code with the sub-system processor, determining whether the security and reliability check of the second image of the code is successful, storing the second image of the code in a first memory device responsive to determining that the security and reliability check of the second image of the code is successful, designating the second image of the code as an active image, and sending the second image of the code to a second memory device, the second memory device communicatively connected with the first memory device and a main processor.

17 Claims, 6 Drawing Sheets

(56) References Cited

U.S. PATENT DOCUMENTS

| | | |
|---|---|---|
| 7,681,009 B2 | 3/2010 | Adatrao et al. |
| 7,752,616 B2 | 7/2010 | Marolia et al. |
| 2007/0174686 A1 | 7/2007 | Douglas et al. |
| 2009/0094450 A1* | 4/2009 | Krzyzanowski et al. ..... 713/100 |
| 2010/0023777 A1 | 1/2010 | Prevost et al. |
| 2010/0199272 A1 | 8/2010 | Mahajan et al. |
| 2010/0318981 A1 | 12/2010 | Helman et al. |
| 2011/0099389 A1* | 4/2011 | Matula et al. ................ 713/300 |
| 2011/0137435 A1 | 6/2011 | Furusawa |
| 2012/0303941 A1* | 11/2012 | Grieco et al. ..................... 713/2 |

FOREIGN PATENT DOCUMENTS

| | | |
|---|---|---|
| EP | 1788506 A2 | 5/2007 |
| JP | 2051951 A | 2/1990 |

OTHER PUBLICATIONS

T. Chen et al., "A New Type of NAND Flash-based File System: Design and Implementation," 2006 IEEE, pp. 1-4.

UK Intellectual Property Office: Combined Search and Examination Report under Sections 17 and 18 (3); Application No. GB1216404.2; Date Mailed: Jan. 11, 2013. pp. 1-7.

* cited by examiner

FIG. 2A

CODE UPDATES IN PROCESSING SYSTEMS

BACKGROUND

The present invention relates to processing systems, and more specifically, to updating code in processing systems.

Processing systems may include a processor that is connected to a memory such as a random access memory (RAM). The processing systems access code stored in the RAM to perform processing tasks. In many systems, the code may include operating system code, driver code, or applications. Some processing systems may also include programmable hardware (PH) devices such as, for example, field programmable gate array (FPGA) processors.

A host processor may be used to send updated code to the processing system such that the processing system may use the updated code to update the code stored in the RAM or to update the PH. In previous systems, an update of the code stored in the RAM or an update of the PH often resulted in an undesirable delay or lapse in processing tasks as a result of the code update process.

BRIEF SUMMARY

According to one embodiment of the present invention, a method for updating code images in a system includes booting a first image of a code with a sub-system processor, receiving a second image of the code, performing a security and reliability check of the second image of the code with the sub-system processor, determining whether the security and reliability check of the second image of the code is successful, storing the second image of the code in a first memory device responsive to determining that the security and reliability check of the second image of the code is successful, designating the second image of the code as an active image, and sending the second image of the code to a second memory device, the second memory device communicatively connected with the first memory device and a main processor.

According to another embodiment of the present invention, a method for updating code images in a system includes booting a first image of a code with a sub-system processor, receiving a second image of the code, performing a security and reliability check of the second image of the code with the sub-system processor, determining whether the security and reliability check of the second image of the code is successful, storing the second image of the code in a first memory device responsive to determining that the security and reliability check of the second image of the code is successful, designating the second image of the code as an active image, programming a first programmable hardware device (PH) with the second image of the code, enabling the first PH and disabling a second PH.

According to another embodiment of the present invention a system includes a main processor, a first memory device communicatively connected to the main processor, a second memory device communicatively connected to the first memory device, and a sub-system processor communicatively connected to the main processor and the second memory device wherein the sub-system processor is operative to boot a first image of a code, receive a second image of the code, perform a security and reliability check of the second image of the code; determine whether the security and reliability check of the second image of the code is successful, store the second image of the code in the first memory device responsive to determining that the security and reliability check of the second image of the code is successful; designate the second image of the code as an active image, and send the second image of the code to the second memory device.

According to another embodiment of the present invention a system includes a main processor, a first programmable hardware device (PH) communicatively connected to the main processor, a second PH communicatively connected to the main processor, a first memory device communicatively connected to the first PH and the second PH, and a sub-system processor communicatively connected to the main processor, the first PH, the second PH, and the first memory device, wherein the sub-system processor is operative to boot a first image of a code, receive a second image of the code, perform a security and reliability check of the second image of the code, determine whether the security and reliability check of the second image of the code is successful, store the second image of the code in the first memory device responsive to determining that the security and reliability check of the second image of the code is successful, designate the second image of the code as an active image, program the first PH with the second image of the code, enabling the first PH, and disabling the second PH.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figures 1, 1A:
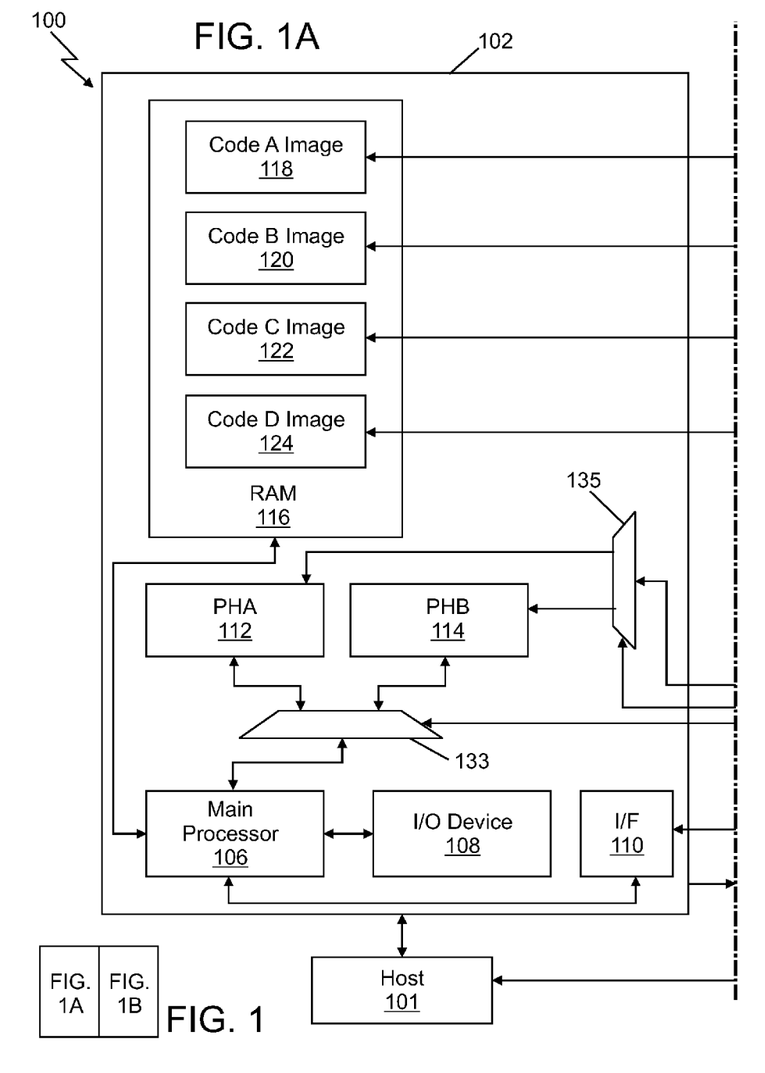
FIG. 1 illustrates an exemplary embodiment of a processing system.
Figure 1B:
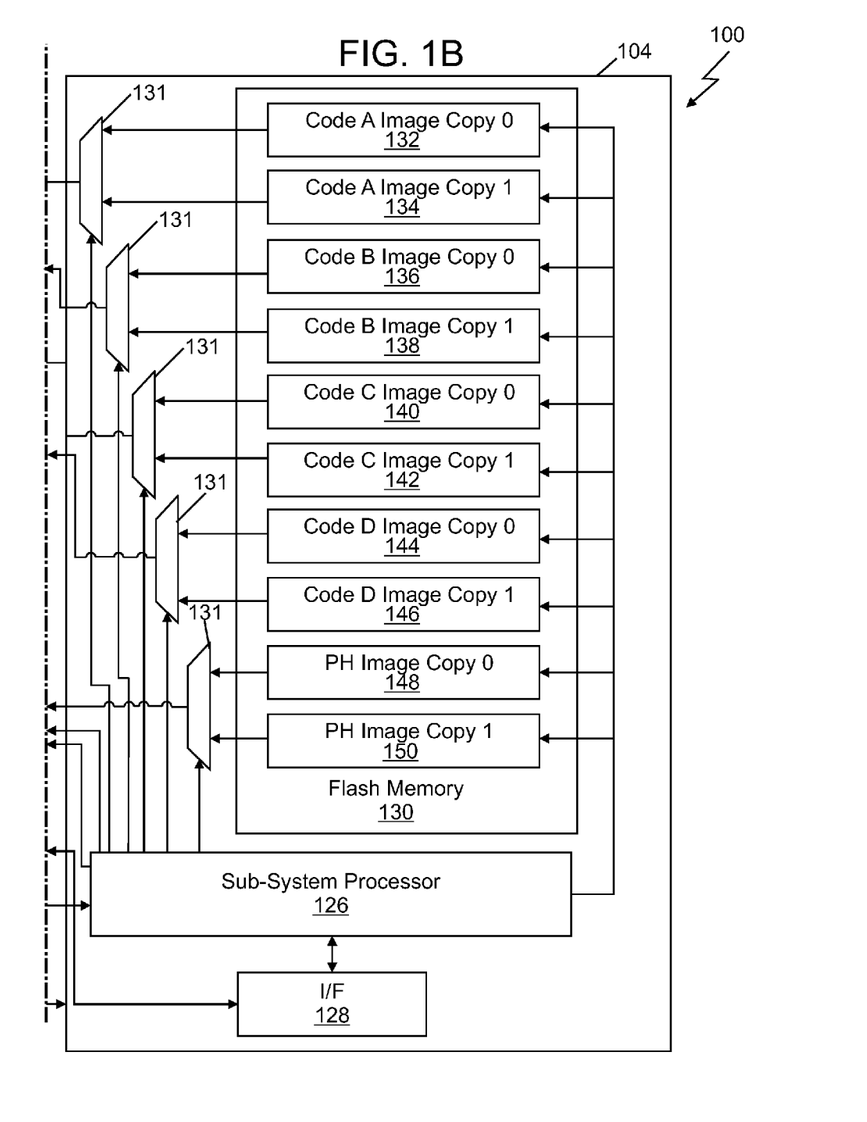

FIG. 1 illustrates an exemplary embodiment of a processing system 100. The system 100 includes a main processor system 102 and a sub-system 104. The main processor system 102 and the sub-system 104 are communicatively connected to a host processor (host) 101. In the illustrated embodiment, the host processor 101 may include any type of processor and memory system that is operative to send commands and code updates to the main processor system 102 and the sub-system 104. The main processor system 102 includes a main processor 106 that is communicatively connected to a memory device 116 such as a random access memory (RAM) device. The main processor 106 is communicatively connected to input/output devices 108 and an interface 110. The main processor system 102 may include one or more programmable hardware (PH) devices PH A 112 and PH B 114. The PH devices may include any type of programmable hardware devices or may represent two or more portions of a single device such as a partitioned programmable hardware device. An example of a PH device includes a programmable hardware device (PH) device. The sub-system 104 includes a sub-system processor 126 that is communicatively connected to an interface 128 and a memory device 130 that may include, for example, a flash memory device. The interface 128 is communicatively connected to the interface 110 of the main processor system 102. The memory device 130 is operative to store images of code and in the illustrated embodiment, PH hardware images. In the illustrated embodiment, the memory device 130 includes a code A image copy 0 132, a code A image copy 1 134, a code B image copy 0 136, a code B image copy 1 138, a code C image copy 0 140, a code C image copy 1 142, a code D image copy 0 144, a code D image copy 1 146, an PH image copy 0 148, and an PH image copy 1 150. The pairs of images of the code stored in the memory device 130 correspond to code images stored in the memory device 116, which include code image A 118, code image B 120, code image C 122, and code image D 124.

The code images A-D 118, 120, 122, and 124 may include any type of code such as, for example, operating system code, driver code, application code, or other types of firmware codes. It is desirable to update the code images while minimizing the down time of the main processor 106. Thus, the system 100 and methods described below, allow the sub-system processor 126 to receive instructions and process code updates from the host 101 while the main processor 106 continues normal operations. For example, if the code A image 118 is an application that is being run by the main processor 106, the memory device 130 of the sub-system 104 maintains an "active" image of the code A image 118. In this example, the active image is the code A image copy 0 132. However, in another example, the active image could alternatively be the code A image copy 1 134. The sub-system processor 126 may be in a stand-by mode until an instruction to wake up is received from the host 101. The host 101 may then send instructions to update the application (code image A 118) with the code update to the sub-system processor 126. The sub-system processor 126 processes the code update and saves the new code as the code A image copy 1 134 in the memory device 130. The sub-system processor 126 may then make the code A image copy 1 134 the active image by manipulating a switching device 131 such as, a multiplexor. The sub-system processor 126 may then send a signal to the main processor 106 indicating that the new code image is ready. The new code image (code A image copy 1 134) may then be retrieved from the memory device 130 and saved in the memory device 116 (e.g., RAM) of the main processor system 102. Since the memory device 130 of the sub-system 104 maintains copies of the active code images stored in the memory device 116 of the main processor system 102, the sub-system processor 126 may perform most or all of the necessary processing and verifications of the code images prior to activating the code images and sending the code images to the main processor system 102. Thus, the main processor system 102 may receive updated code images without appreciably sacrificing main processing tasking due to code updating processing.

Figure 2A:
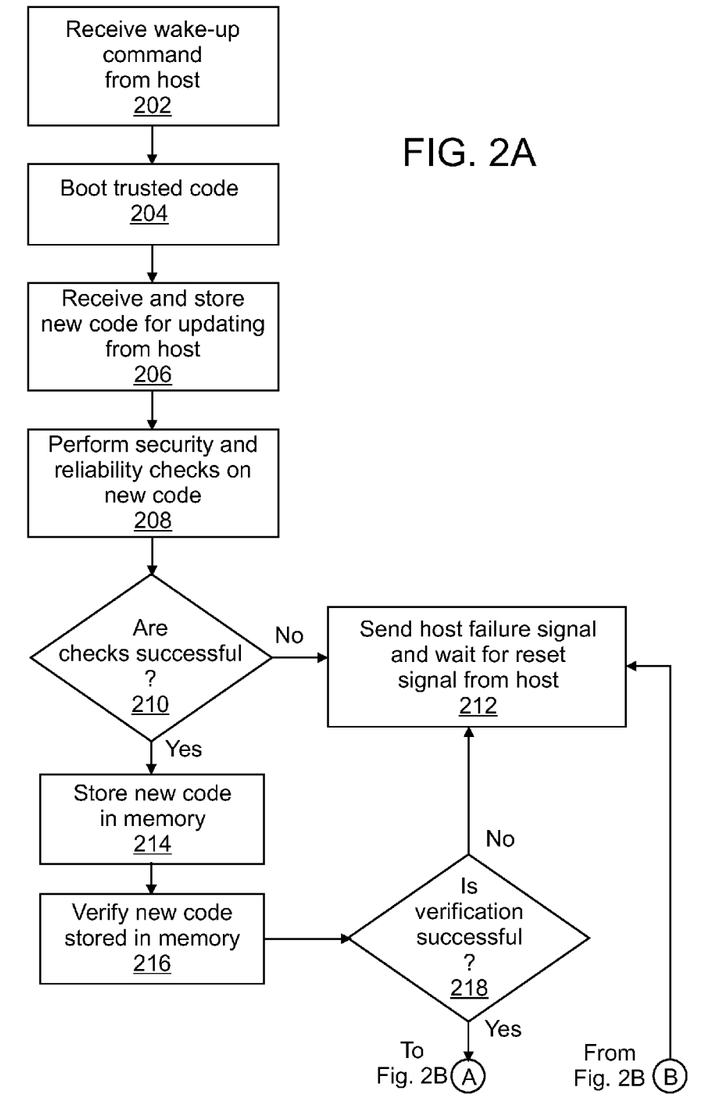
FIGS. 2A and 2B illustrate a block diagram of an exemplary method for updating code images in the system of FIG. 1.
Figure 2B:
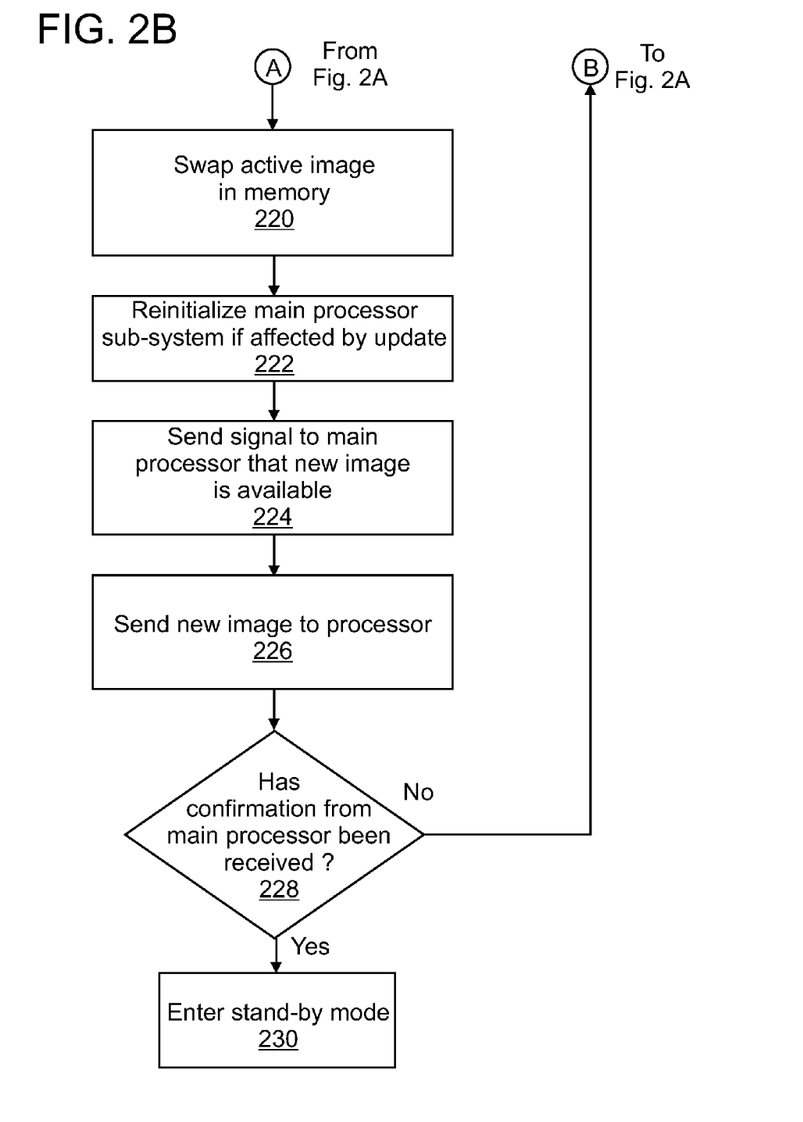

FIGS. 2A and 2B illustrate a block diagram of an exemplary method for updating code images in the system 100 (of FIG. 1). In block 202, a wake-up command is received by the sub-system processor 126 from the host 101. The sub-system processor 126 wakes-up and boots the trusted code in block 204. The trusted code includes a piece of code that is stored in read-only memory (ROM) on the card and therefore not updatable. The code is loaded during manufacturing of the hardware. During normal operation the sub-system processor 126 boots from this code, which includes the functions to perform the code updates, reliability and security checks. In block 206, the sub-system processor 126 receives and stores new code (e.g., new code image A) for updating from the host 101. The sub-system processor 126 performs security and reliability checks on the new code in block 208. Security and reliability checks vary depending on the application, level of security and compliance rules to be certified. The security checks may include, for example, digital signature verification, hash values comparison, checksum comparison, and encryption algorithms to decode the image. In block 210, the sub-system processor 126 determines if the security and reliability checks have been successful. If no, the sub-system processor 126 sends a failure signal to the host 101 and may wait for a reset signal from the host 101 in block 212. In block 214, the sub-system processor 126 stores the new code in the memory device 130. The new code is saved in a non-active memory location that is associated with the code image (e.g., code A image copy 1 if code A image copy 0 is the active image copy). The sub-system processor 126 verifies the new code stored in the memory device 130 in block 216. The verification may include, for example, decrypting the image that is to be updated with a master key or digital signature comparisons. In block 218, the sub-system processor 126 determines if the verification was successful. If no, a failure signal is sent to the host 101 in block 212. Referring to FIG. 2B, in block 220, the new code image saved in the non-active memory location is designated as the active image. The designation may be performed by the sub-system processor 126 changing the state of a switching device 131 such that the new image may be sent to the memory device 116 and accessed by the main processor 106. In block 222, any main processor 106 sub-systems may be reinitialized if the sub-systems have been affected by the code update. For example, in the case of updating PH, the sub-system may be reinitialized when the subsystem resets and initializes the hardware update, this may include setting initial values of control registers and setting mode of operations. In the case of code updates the main processor handles the re-initialization with the new code.

In block 224, a signal is sent from the sub-system processor 126 to the main processor 106 that a new image is available. In block 226, the new image (active image) may be sent to the memory device 116 to be used by the main processor 106. The sub-system processor 126 determines whether a confirmation signal indicating that the active image was received by the main processor 106 has been received in block 228. If the confirmation message has been received by the sub-system processor 126, the sub-system processor 126 may enter a stand-by mode in block 230.

The system 100 (of FIG. 1) may be used to change or update the hardware description language (HDL) code of the PH A and B 112 and 114 (of FIG. 1) that may operate in the system 100. In exemplary operation, one of the PHs (e.g., PH A 112) may operate or be "active" while the other PH (e.g., PH B 114) is available to receive updates or changes to the HDL code from the sub-system 104. Once the sub-system 104 has changed the HDL code in the non-active PH B 114, the sub-system 104 may make the non-active PH B 114 active, and the PH A 112 non-active by, for example, changing the state of a switching device 133. In the illustrated embodiment of FIG. 1, a switching device 135 is disposed in a communications path between the PHs A and B 112 and 114 and the PH image copy 0 148 and the PH image copy 1 150 located in the memory device 130 of the sub-system 104.

Figure 3A:
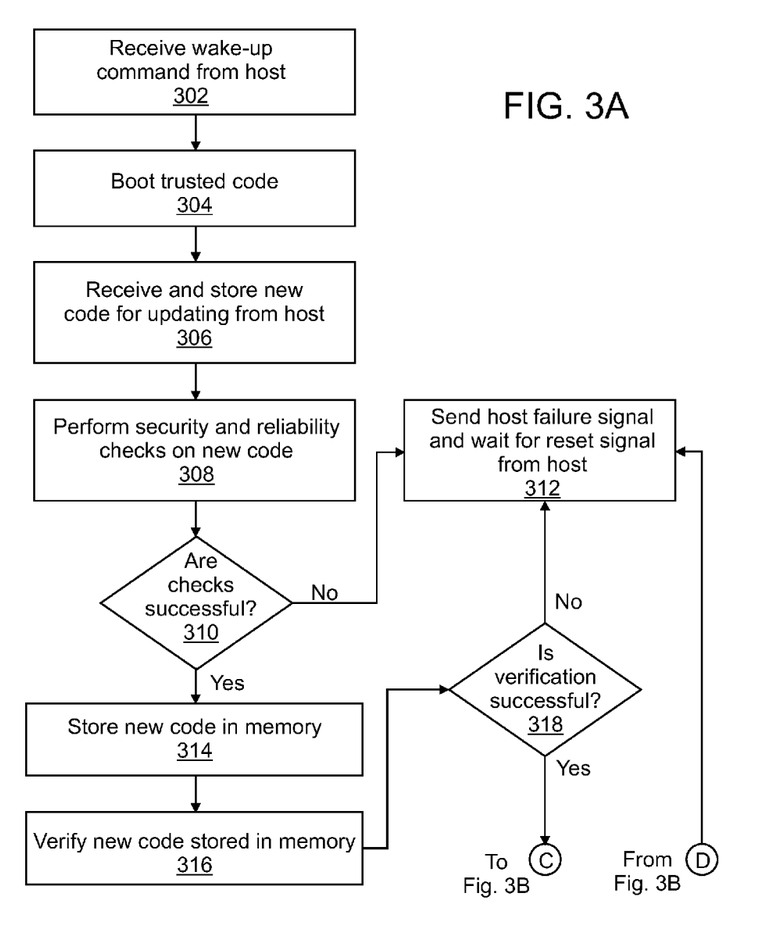
FIGS. 3A and 3B illustrate a block diagram of an exemplary method for changing the hardware description language code of the system of FIG. 1.
Figure 3B:
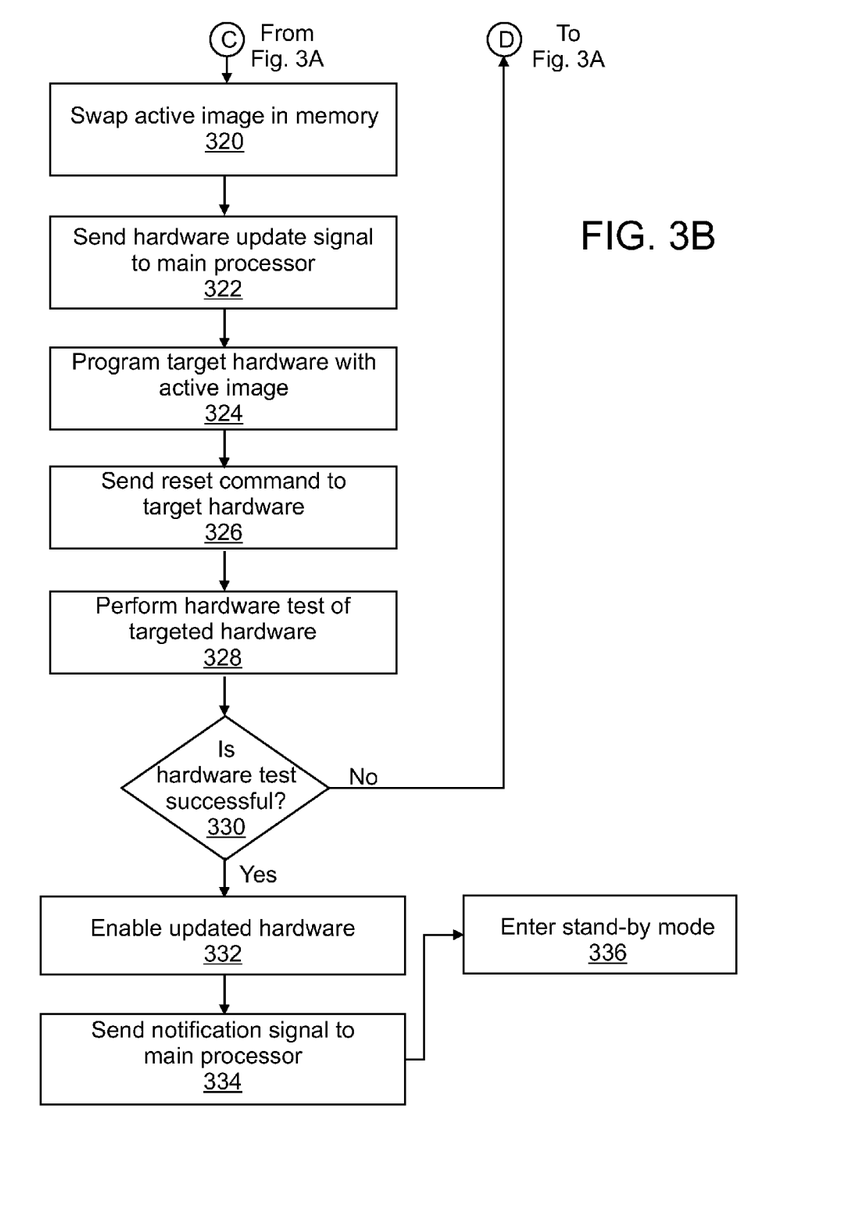

FIGS. 3A and 3B illustrate a block diagram of an exemplary method for changing or updating the hardware description language (HDL) code of the PH A and B 112 and 114 (of FIG. 1) that may operate in the system 100. Referring to FIG. 3A, in block 302, a wake-up command is received by the sub-system processor 126 from the host 101. The sub-system processor 126 wakes-up and boots the trusted code in block 304. In block 306, the sub-system processor 126 receives and stores new code (e.g., new PH image) for updating from the host 101. The sub-system processor 126 performs security and reliability checks on the new code in block 308. In block 310, the sub-system processor 126 determines if the security and reliability checks have been successful. If no, the sub-system processor 126 sends a failure signal to the host 101 and may wait for a reset signal from the host 101 in block 312. In block 314, the sub-system processor 126 stores the new code in the memory device 130. The new code is saved in a non-active memory location that is associated with the code image (e.g., PH image copy 1 if PH image copy 0 is the active image copy). The sub-system processor 126 verifies the new code stored in the memory device 130 in block 316. In block 318, the sub-system processor 126 determines if the verification was successful. If no, a failure signal is sent to the host 101 in block 312. Referring to FIG. 3B, in block 320, the new code image saved in the non-active memory location is designated as the active image. The designation may be performed by the sub-system processor 126 changing the state of a switching device 131 such that the new image may be sent to the non-active or target PH (e.g., PH B 114). In block 322, a hardware update signal may be sent to the main processor 106. The target hardware (PH B 114) is programmed with the active image in block 324. In block 326, a reset command may be sent to the target hardware. A hardware test of the target hardware is performed in block 328. In block 330, the sub-system processor 126 determines whether the hardware test was successful. If, yes, the target hardware is enabled in block 332 by, for example, sending a signal from the sub-system processor 126 to change the state of the switching device 133 to make the target hardware (PH B 114) the active PH. In block 334, a notification signal may be sent from the sub-system processor 126 to the main processor 106 indicating that the PH B 114 is the active and updated PH. The sub-system processor 126 may enter a stand-by mode in block 336.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for updating code images in a system, the method comprising:
    booting a first image of a code with a sub-system processor;
    receiving a second image of the code;
    performing a security and reliability check of the second image of the code with the sub-system processor;
    determining whether the security and reliability check of the second image of the code is successful; and
    responsive to determining that the security and reliability check of the second image of the code is successful:
        storing the second image of the code in a first location of a first memory device;
        designating the second image of the code as an active image by changing a state of a switching device from a first state to a second state, the switching device corresponding to the first location of the first memory device and to a second location of the second memory device; and
        sending the second image of the code to the second location of the second memory device, the second location of the second memory device communicatively connected with the first location of the first memory device through the switching device, and the second memory device communicatively connected with a main processor.

2. The method of claim 1, further comprising sending a signal to the main processor indicating that the second image of the code is available responsive to designating the second image of the code as the active image.

3. The method of claim 1, further comprising verifying the second image of the code stored in the first memory device responsive to storing the second image of the code in the first memory device.

4. The method of claim 3, wherein the designating the second image of the code as the active image is performed responsive to determining that the verification of the second image of the code stored in the first memory device is successful.

5. The method of claim 3, wherein the verifying of the second image of the code stored in the first memory device includes decrypting the second image with a master key.

6. The method of claim 1, further comprising receiving a wake-up message from a host processor prior to booting the first image of the code with the sub-system processor.

7. The method of claim 1, further comprising reinitializing a sub-system of the main processor responsive to designating the second image of the code as the active image.

8. The method of claim 1, wherein the second image of the code is received by the sub-system processor from a host processor communicatively connected to the sub-system processor.

9. The method of claim 1, wherein the performing of the security and reliability check of the second image of the code with the sub-system processor includes performing a digital signature verification of the second image.

10. The method of claim 1, further comprising responsive to determining that the security and reliability check of the second image of the code is unsuccessful:
sending a host failure signal to a host processor.

11. The method of claim 10, further comprising responsive to determining that the security and reliability check of the second image of the code is unsuccessful:
waiting for a reset signal from the host processor, the reset signal being in response to the host failure signal.

12. The method of claim 1, further comprising:
receiving a wake-up message from a host processor prior to booting the first image of the code with the sub-system processor; and
sending a signal to the main processor indicating that the second image of the code is available and reinitializing a sub-system of the main processor responsive to designating the second image of the code as the active image, wherein the second image of the code is received by the sub-system processor from the host processor communicatively connected to the sub-system processor.

13. The method of claim 1, wherein the second image of the code stored in a portion of the first memory device that is communicatively connected to the second memory and the main processor when the switching device is in the second state.

14. A system comprising:
a switching device;
a main processor;
a first memory device communicatively connected to the main processor;
a second memory device communicatively connected to the first memory device, wherein a second location of the second memory device is communicatively connected with a first location of the first memory device through the switching device; and
a sub-system processor communicatively connected to the main processor and the second memory device wherein the sub-system processor is operative to
boot a first image of a code, receive a second image of the code, perform a security and reliability check of the second image of the code;
determine whether the security and reliability check of the second image of the code is successful; and
responsive to determining that the security and reliability check of the second image of the code is successful,
store the second image of the code in the first location of the first memory device,
designate the second image of the code as an active image by changing a state of a switching device from a first state to a second state, the switching device corresponding to the first location of the first memory device and to the second location of the second memory device, and
send the second image of the code to the second location of the second memory device.

15. The system of claim 14, wherein the sub-system processor is further operative to send a signal to the main processor indicating that the second image of the code is available responsive to designating the second image of the code as the active image.

16. The system of claim 14, wherein the sub-system processor is further operative to verify the second image of the code stored in the first memory device responsive to storing the second image of the code in the first memory device.

17. The system of claim 16, wherein the designating the second image of the code as the active image is performed responsive to determining that the verification of the second image of the code stored in the first memory device is successful.

* * * * *